United States Patent
Sror et al.

(10) Patent No.: US 11,620,665 B2
(45) Date of Patent: Apr. 4, 2023

(54) METHODS AND SYSTEMS USING AND CONSTRUCTING MERCHANT COMMUNITIES BASED ON FINANCIAL TRANSACTION DATA

(71) Applicant: Intuit Inc., Mountain View, CA (US)

(72) Inventors: Elik Sror, Tel Aviv (IL); Shiomi Medalion, Tel Aviv (IL); Miriam Hanna Manevitz, Tel Aviv (IL); Adi Shalev, Tel Aviv (IL); Yair Horesh, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 58 days.

(21) Appl. No.: 16/837,376

(22) Filed: Apr. 1, 2020

(65) Prior Publication Data

US 2021/0312485 A1    Oct. 7, 2021

(51) Int. Cl.
G06Q 30/02       (2012.01)
G06Q 30/0204     (2023.01)

(52) U.S. Cl.
CPC ............... G06Q 30/0204 (2013.01)

(58) Field of Classification Search
CPC .................................................. G06Q 30/0204
See application file for complete search history.

(56) References Cited

U.S. PATENT DOCUMENTS

| | | | |
|---|---|---|---|
| 10,789,643 B1* | 9/2020 | Chang | H04L 67/535 |
| 2006/0149637 A1* | 7/2006 | Zellner | G06Q 30/0254 |
| | | | 705/14.23 |
| 2012/0101881 A1* | 4/2012 | Taylor | G06Q 30/04 |
| | | | 705/14.36 |
| 2012/0222339 A1* | 9/2012 | Dubinski | G09F 23/08 |
| | | | 40/324 |
| 2018/0047099 A1* | 2/2018 | Bonig | G06Q 10/1093 |
| 2018/0165775 A1* | 6/2018 | Bhattacharjee | G06Q 30/0202 |
| 2018/0330192 A1* | 11/2018 | Atasu | G06K 9/6226 |
| 2019/0286739 A1* | 9/2019 | Modarresi | G06F 16/2465 |
| 2019/0362263 A1* | 11/2019 | Harris | G06N 20/00 |

FOREIGN PATENT DOCUMENTS

WO    WO-2021066816 A1 *   4/2021    ........... G06F 16/337

OTHER PUBLICATIONS

Bayan, B. (Jul. 16, 2019). DeepTrax: Embedding Graphs of Financial Transactions. arXiv.org. https://arxiv.org/abs/1907.07225 (Year: 2019).*
English translation of WO2021066816A1 (Year: 2019).*

* cited by examiner

*Primary Examiner* — Mehmet Yesildag
*Assistant Examiner* — Jeremy L Gunn
(74) *Attorney, Agent, or Firm* — DLA Piper LLP (US)

(57) ABSTRACT

Systems and methods may be used to generate and use a merchant community graph generated based on merchant financial transaction data. Connections between merchants and other data within the merchant community graph can be used to detect fraud, target product offerings and or other advertisements, detect similar communities, generate dynamic attributes that may be used to develop machine learning models, and develop new user interfaces (UIs) and other features of an information service.

18 Claims, 7 Drawing Sheets

METHODS AND SYSTEMS USING AND CONSTRUCTING MERCHANT COMMUNITIES BASED ON FINANCIAL TRANSACTION DATA

BACKGROUND

Financial transaction data is dense and difficult to analyze. Large sets of financial transaction data can include millions of merchants and billions of transactions. Assembling spreadsheets, tables, financial statements, and other traditional ways of representing financial transaction data can take hours or days. Additionally, these static data formats provide only a limited perspective of how businesses operate and perform. New ways of presenting data are desirable to generate data formats that make analyzing financial transaction data faster and more efficient. Additionally, there is also a need to improve analysis of financial transaction data to generate in less time more meaningful data on business operations and performance.

DETAILED DESCRIPTION OF SEVERAL EMBODIMENTS

Embodiments described herein may construct and use merchant communities formed from financial transaction data from one or more merchants. Each node in a merchant community may represent a merchant that transacts with other members of the community. Edges between nodes in the merchant community may represent specific transactions that take place between merchants. Once connections between merchants are established, merchants are clustered based on the connections to form a merchant community. Merchant communities may be dynamic communities that are monitored over time based on real time transactions. To visualize the connections between merchants in a community, one or more merchant communities may be represented in a merchant community graph.

Analysis (e.g., collaborative filtering, ranking, identifying similar communities, merchant segmentation, profiling, and the like) can be done on the communities to better understand the merchants, business relationships, and industry trends. For example, connections between merchants may be used to identify customer relationships. Merchant attributes including merchant location and industry can be used to determine local competitors and identify potential new customers. Connection attributes including the number of transactions between merchants and the value of each transaction can also be used to identify important business relationships.

Merchant communities may be tracked over time to understand how business communities develop and change. For example, tracking a merchant community over a period of months or years may reveal new business relationships, determine the health of a particular industry, determine where demand for a particular product and or service is moving, and the like. Segmenting merchants according to their roles and connections within a merchant community may also help identify products and services particular merchants might need. Product offerings and advertisements may then be targeted to particular merchants that match the characteristics of a particular segment. Merchant communities may also be used to detect fraud and determine a reputation for each merchant within a community. Merchant communities may also be analyzed to construct dynamic merchant attributes that may be input into machine learning models that can predict, for example, new customer leads, new vendors, industry forecasts, and the like.

Generating merchant communities and merchant community graphs may make financial transaction data easier to understand and analyze. Spreadsheets, tables, and or balance sheets, income statements, and other conventional bookkeeping records are static data formats that provide a limited view of financial transaction data. Insights embedded in financial transaction data, for example, relationships between merchants, the role of each merchant within a particular industry, the significance of particular transitions, the composition of the business community a merchant participates in, and the like are not recognizable from previous data formats. Merchant communities and merchant community graphs may expose these insights as merchant community data that includes more detailed information about merchants, transactions, and industries.

Merchant communities and merchant community graphs may improve upon previous data formats by providing a three dimensional, dynamic data format for financial transaction data that makes analysis of financial transaction data faster and more efficient. Determining the number of transactions between two particular merchants and other analyses that took hours using previous data formats can now be conducted in a matter of seconds using merchant communities and merchant community graphs. Additionally, merchant community data, for example, merchant roles, merchant relationships, merchant attributes, transaction attributes, included in merchant communities may be used for a variety of applications. For example, merchant community data may be used to target product offering and advertisements, detect fraud, generate labeled training data for machine learning applications, identify new product features to develop, and the like.

Figure 1:
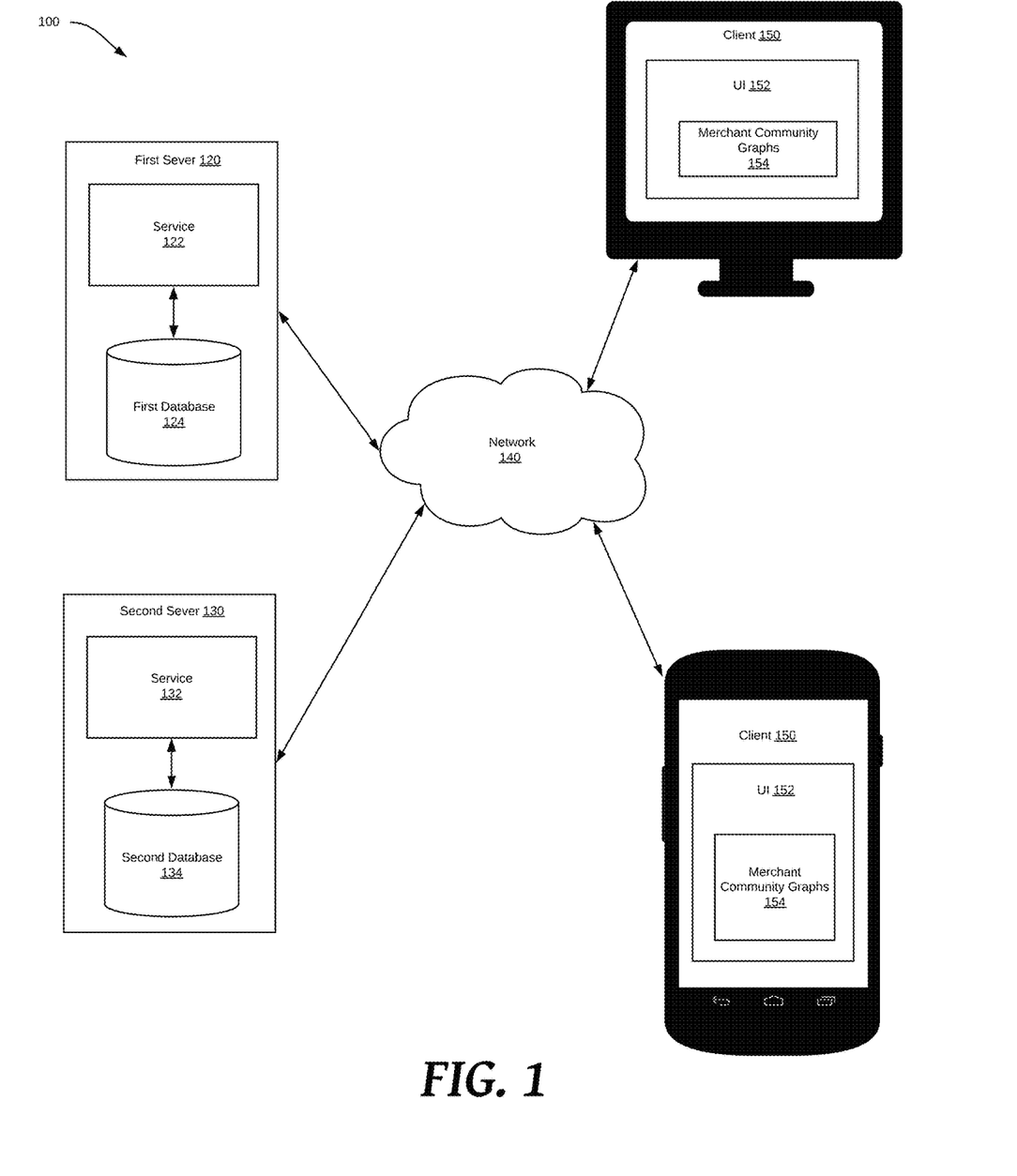
FIG. 1 shows an exemplary system configured to use and generate merchant communities in accordance with an embodiment of the present disclosure.

FIG. 1 shows an example of a system 100 configured to implement a process for constructing and using a merchant community according to an embodiment of the present disclosure. System 100 may include a first server 120, second server 130, and or one or more client devices 150. First server 120, second server 130, and or client device(s) 150 may be configured to communicate with one another through network 140. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 140 may be the Internet and/or other public or private networks or combinations thereof.

First server 120 may be configured to implement a first service 122, which in one embodiment may be used to input financial transaction data via network 140 from one or more databases 124, 134, the second server 130 and or client device(s) 150. The first server 120 may execute the process for constructing and using a merchant community according to the disclosed principles using financial transaction data stored in database 124, database 134 and or received from second server 130 and/or client device(s) 150. First service 122 or second service 132 may implement an information service, which may maintain data concerning merchant financial transactions. The information service may be any network 140 accessible service that maintains user financial transactions. For example, the information service may include QuickBooks® and its variants by Intuit® of Mountain View Calif. The information service may provide one or more features that use merchant communities constructed by the system 100.

Client device(s) 150 may be any device configured to present user interfaces (UIs) 152 and receive inputs thereto. The UIs 152 may be configured to display merchant communities, data included in the merchant communities (e.g., merchant identifiers (ids), connection attributes, community size, merchant attributes, and the like), and/or merchant community graphs 154 illustrating one or more merchant communities. Exemplary client devices 150 may include a smartphone, personal computer, tablet, laptop computer, or other device.

First server 120, second server 130, first database 124, second database 134, and client device(s) 150 are each depicted as single devices for ease of illustration, but those of ordinary skill in the art will appreciate that first server 120, second server 130, first database 124, second database 134, and or client device(s) 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one or two) servers. In another example, a plurality of client devices 150 may communicate with first server 120 and/or second server 130. A single user may have multiple client devices 150, and/or there may be multiple users each having their own client device(s) 150.

Figure 2:
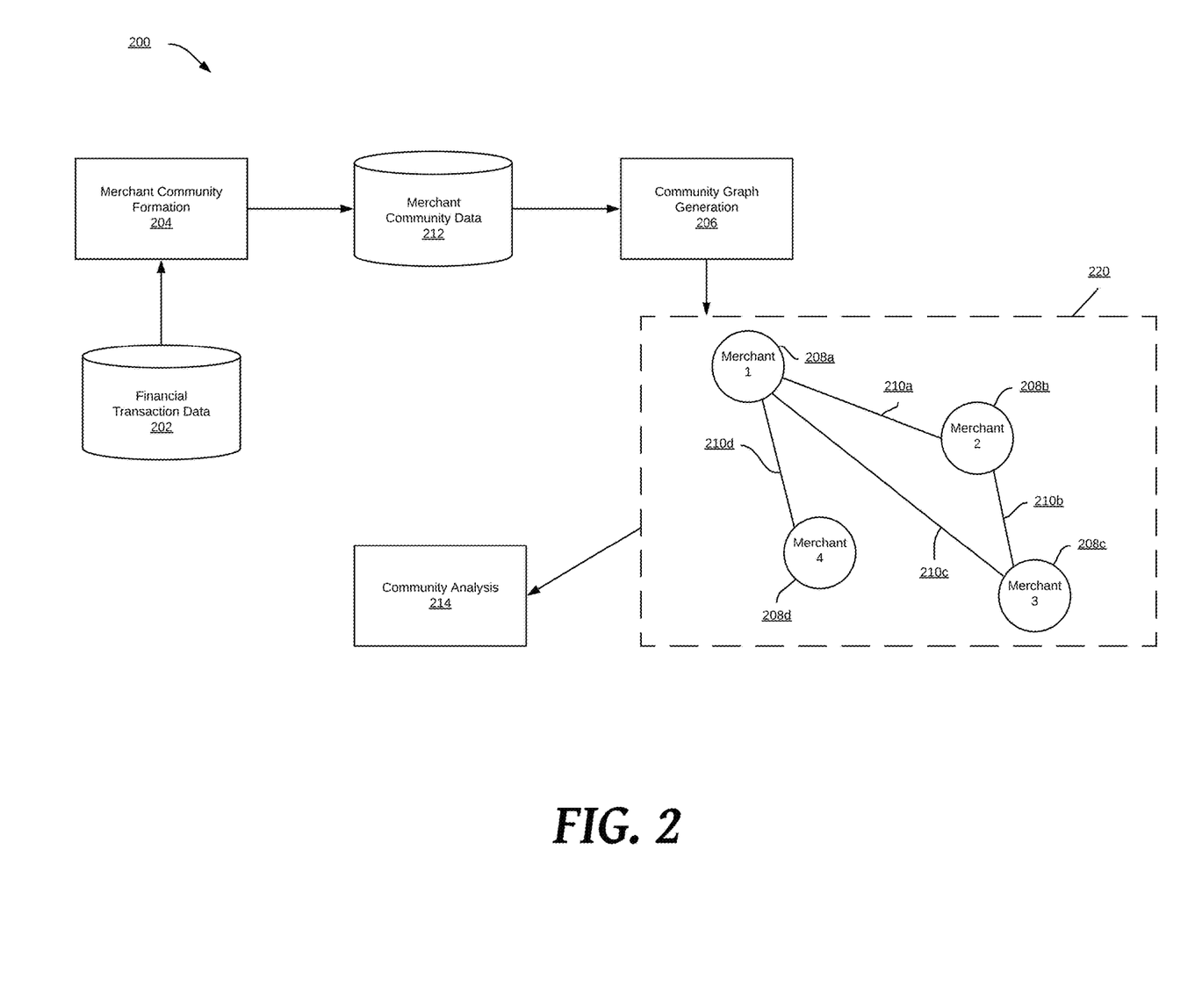
FIG. 2 shows a functional block diagram of an exemplary process for constructing and using merchant communities according to an embodiment of the present disclosure.

FIG. 2 illustrates a functional block diagram of an example process 200 for constructing and using a merchant community graph 220 according to an embodiment of the present disclosure. The merchant community graph 220 may be an exemplary visual representation of one or more merchant communities constructed by the system 100. In one embodiment, system 100 may perform some or all of the processing illustrated in FIG. 2. For example, first server 120 may perform the illustrated merchant community formation 204, community graph generation 206, and or the community analysis 212 functions discussed in detail below with respect to FIGS. 3-6. During the execution of the merchant community formation 204 function, first server 120 may input financial transaction data 202. Financial transaction data 202 may be extracted from one or more digital and or physical documents containing evidence of a transaction, for example, invoices, receipts, tax documents, estimates, money transfers, bank wires, emails, messages, and the like. For example, the merchant initiating an invoice and the merchant receiving the invoice may be extracted from a physical invoice document, a digital scan of the invoice document, or other physical or electronic form of the document using ocular character recognition (OCR) of other information extraction technique. Financial transaction data 202 may be stored in a database, for example, the first database 124 and or second database 134.

To construct a merchant community graph 220, the process 200 may execute a merchant community formation function 204 that clusters merchants to form merchant communities based on connections between merchants included in the financial transaction data 202. Connections may be determined from transactions involving two or more merchants. For example, transaction data extracted from receipts and or invoices may be used to link the merchants identified as parities to the transaction (e.g., the merchant sending the invoice and or the merchant generating the receipt) together. Merchants may then be clustered to form merchant communities based on the connections using one or more clustering techniques. For example, two or more merchants having a strong overall connectivity between them may be clustered to form a community. Merchants included in a group having full connectivity between all members of the group may also be clustered together to form a community. Merchant community data 212 for the communities (e.g., community id, merchant ids, connections, merchant attributes, connection attributes, and the like) may be stored in a database, for example, the first database 124 and or second database 134.

The process 200 may execute a community graph generation 206 function to create a merchant community graph 220 based on the merchant community data 212. The merchant community graph 220 may be stored in one or more of the first database 124 and or second database 134 and provided to a user on a client device 150. The merchant community graph 220 may comprise one or more nodes 208a, 208b, 208c, 208d associated with various merchants Merchant 1, Merchant 2, Merchant 3, Merchant 4 identified by the input financial transaction data. The merchant community graph 220 may comprise one or more connections 210a, 210b, 210c, 210d between the one or more nodes 208a, 208b, 208c, 208d.

In the illustrated example, the first node 208a associated with Merchant 1 is connected to the third node 208c associated with Merchant 3 via connection 210c, the second node 208b associated with Merchant 2 via connection 210a, and the fourth node 208d associated with Merchant 4 via connection 210d. In addition, in the illustrated example, the second node 208b associated with Merchant 2 is connected to the third node 208c associated with Merchant 3 via connection 210b. The creation, contents and use of the merchant community are described in more detail below with respect to FIGS. 3-6.

Figure 3:
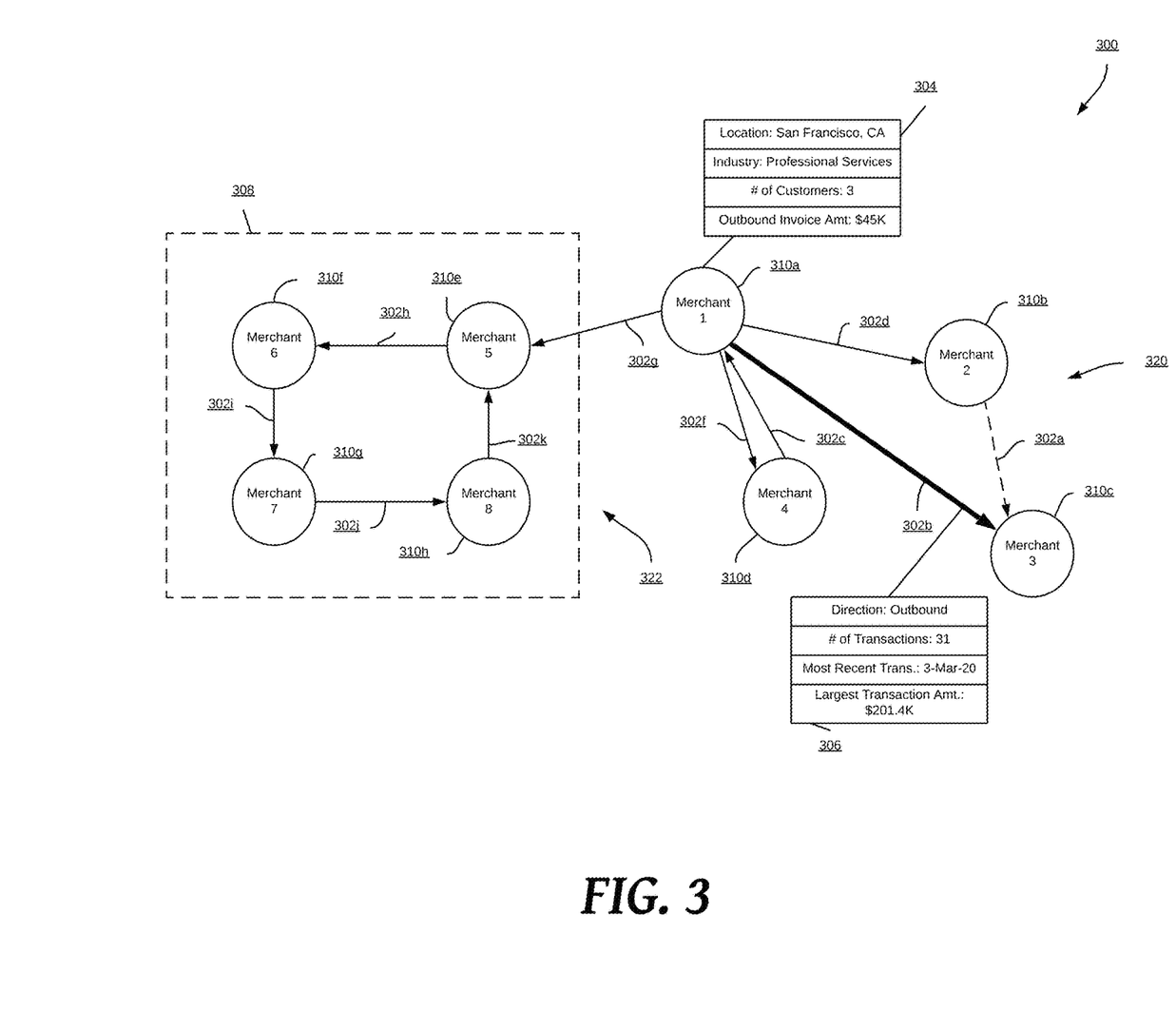
FIG. 3 shows an exemplary merchant community according to an embodiment of the present disclosure.

FIG. 3 shows an exemplary merchant community graph 300. The illustrated graph 300 contains eight nodes 310a, 310b, 310c, 310d, 310e, 310f, 310g, 310h respectively associated with merchants Merchant 1, Merchant 2, Merchant 3, Merchant 4, Merchant 5, Merchant 6, Merchant 7, and Merchant 8. Each node is connected to one or more nodes by a connection. As shown in FIG. 3, nodes may be included in one or more merchant communities. For example, the first node 310a is included in a first merchant community 320 comprising nodes 310a-d and a second merchant community 322 comprising nodes 310a and 310e-h. Within one or more merchant communities, there may be merchant sub communities that have characteristics that are not shared among all nodes in the merchant community. For example, the second merchant community 322 includes a merchant sub community 308 including nodes 310*e-h*. The connections in the merchant sub community 308 indicate a pattern of circular financial transactions between nodes in the sub community 308 that may be interpreted as fraud, money laundering, or some other illegal activity.

As shown in the merchant community graph 300, the connections between each node are uni-directional (e.g., outbound or inbound). For example, the first node 310*a* has an outbound connection 302*d* with the second node 310*b* (Merchant 2). The outbound direction of the outbound connection 302*d* is illustrated by the arrowhead on the outbound connection 302*d* pointing towards the second node 310*b*. The outbound direction describes the type of financial transaction represented by the outbound connection 302*d*. For example, the outbound connection 302*d* represents a financial transaction initiated by Merchant 1 (e.g., paying an invoice) that was sent to Merchant 2 for completion (e.g., payment). The inbound connection 302*c* between the fourth node 310*d* (Merchant 4) and the first node 310*a* (Merchant 1) represents a financial transaction initiated by Merchant 4 (e.g., wiring payment) that was sent to Merchant 1 for completion (e.g., receiving payment). Therefore, the direction of the connection indicates the role of each merchant (e.g., supplier, customer, and the like) in the transaction.

Connections between one or more merchants may also be weighted. As shown in the illustrated example, the second node 310*b* (Merchant 2) has as a weak connection 302*a* (shown as dashed lines) to the third node 310*c* (Merchant 3). The first node 310*a* (Merchant 1) has a moderate connection 302*f* to the fourth node 310*d* (Merchant 4). The outbound connection 302*d* and the inbound connection 302*c* are also moderate connections and all connections between the first node 310*a* and the nodes in the sub community cluster 308 are moderate connections. A strong connection 302*b* is shown between the first node 310*a* (Merchant 1) and the third node 310*c* (Merchant 3). Connections may be weighted according to one or more connection attributes 306. For example, a strong connection 302*b* shown by a thick, bold line may be used to represent several transactions between merchants, a recent transaction between merchants, and or a high dollar value transaction. Weak connections may a represent, for example, a single transaction, infrequent transactions, a transaction that occurred a long time ago, and or a low dollar value transaction. Connection attributes 306 such as e.g., transaction direction, number of transactions, elapsed time since last transaction, transaction amount, average transaction amount, and the like (only some of which are illustrated in FIG. 3) may be added to the merchant community graph 300 to enrich the graph.

One or more merchant attributes 304 may also be added to the merchant community graph 300. Merchant attributes 304 may describe the merchants included in the graph 300 and may be extracted from transaction data and/or merchant profiles stored on a database, for example, the first database 124 and or the second database 134. Merchant attributes 304 may include, for example, location, industry, number of customers, supplies, merchant connections, and the like, and transaction statistics including outbound invoice amounts, gross receipt amounts, inbound invoice amounts, average inbound transaction amount, average outbound transaction amount, total transactions, and the like (only some of which are illustrated in FIG. 3).

In one exemplary user interface (UI), connection attributes 306 and or merchant attributes 304 may be shown on the merchant community graph 300 as shown in FIG. 3. The exemplary UI have also include a function for making the merchant community graph 300 dynamic. For example, the UI may display the connection attributes 306 and or the merchant attributes 304 in response to a user hovering over and or selecting a connection or node. It should be appreciated that the illustrated merchant community graph 300 is just an example and that it, and the underlying data discussed below, are mere examples of the disclosed principles and do not limit the scope of the disclosure.

The exemplary merchant community graph 300 was constructed based on an exemplary input transaction data set shown in the following table:

| Initiating merchant | Receiving merchant | Number of transactions | Most recent transaction date | Largest transaction amount |
|---|---|---|---|---|
| Merchant 1 | Merchant 2 | 5 | 21 Feb. 2020 | $1,003 |
| Merchant 1 | Merchant 3 | 31 | 13 Mar. 2020 | $201,400 |
| Merchant 1 | Merchant 4 | 6 | 12 Feb. 2020 | $2,155 |
| Merchant 1 | Merchant 5 | 8 | 23 Feb. 2020 | $1,577 |
| Merchant 2 | Merchant 3 | 1 | 6 Jun. 2020 | $419 |
| Merchant 4 | Merchant 1 | 7 | 25 Feb. 2020 | $3,221 |
| Merchant 5 | Merchant 6 | 8 | 19 Feb. 2020 | $610 |
| Merchant 6 | Merchant 7 | 8 | 20 Feb. 2020 | $610 |
| Merchant 7 | Merchant 8 | 8 | 21 Feb. 2020 | $610 |
| Merchant 8 | Merchant 5 | 8 | 22 Feb. 2020 | $610 |

To construct the exemplary merchant community graph 300, the input transaction dataset was mined from financial transaction documents and other raw financial transaction data. The financial transaction data may be used to determine the connections between merchants, the direction of the connections, and or the strength of the connections. As shown in merchant community graph 300, three connection strengths were used: weak (e.g., connection 302*a*), moderate (e.g., connections 302*c*, 302*d*, 302*f* 302*g*, 302*h*, 302*i*, 302*j*, 302*k*), and strong (e.g., connection 302*b*). The direction for each connection is shown by the direction of the arrow representing each connection. Connection types, merchant attributes, connection attributes, and other merchant community data discussed herein were not included in the exemplary transaction data table.

Once the connections between each merchant are determined, a clustering technique is used to form merchant communities based on the transaction data. A merchant community graph 300 is then generated to illustrate one or more merchant communities. An exemplary merchant community data set used to create the merchant community graph 300 shown in FIG. 3 is shown below:

| Community members | Community size | Fraud Detection | Total transactions |
|---|---|---|---|
| Merchant 1, Merchant 2, Merchant 3, Merchant 4 | 4 | No | 50 |
| Merchant 1, Merchant 5, Merchant 6, Merchant 7, Merchant 8 | 5 | Yes | 40 |

Figure 4:
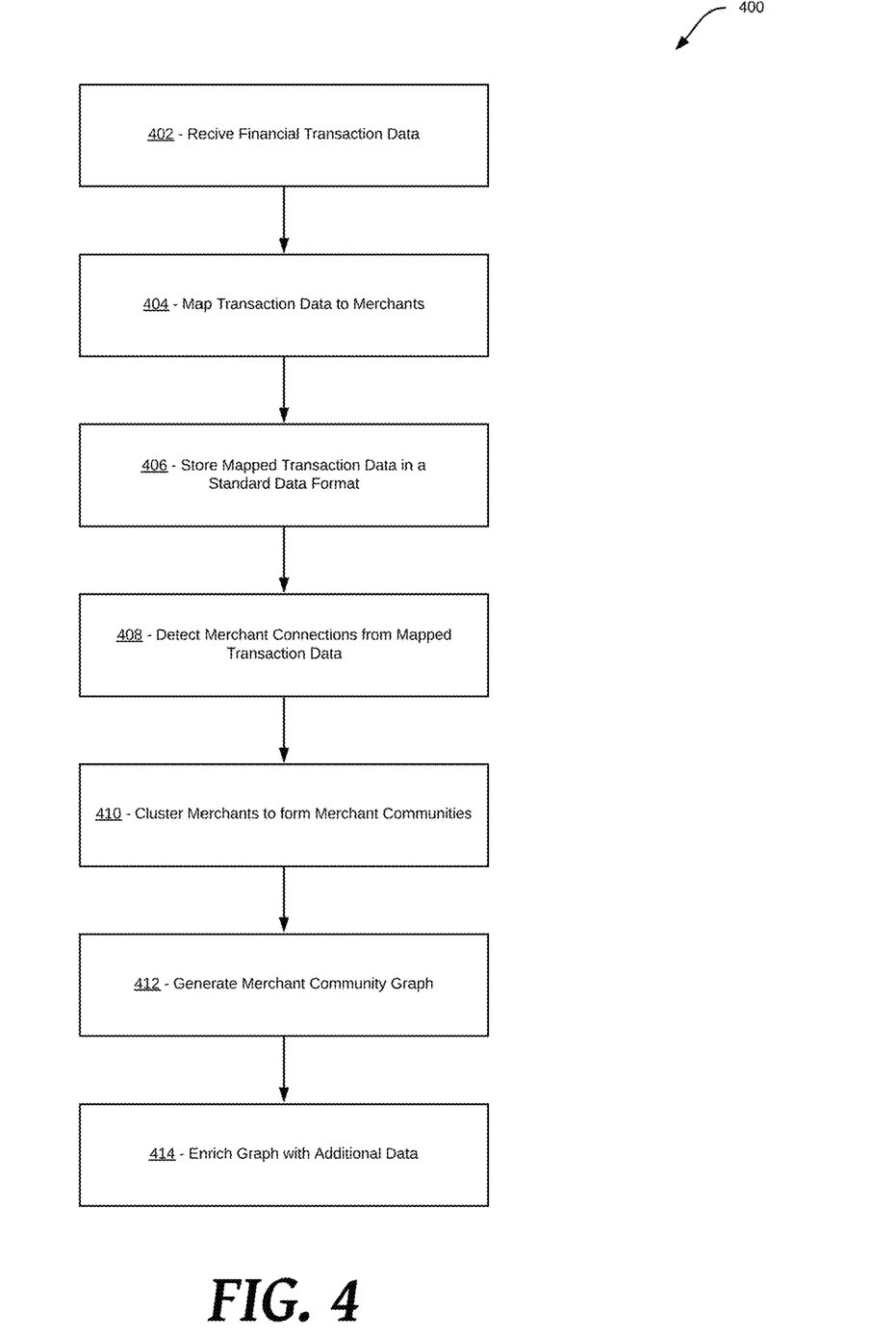
FIG. 4 shows a flow diagram illustrating an exemplary process for constructing merchant communities according to an embodiment of the present disclosure.

FIG. 4 shows an exemplary merchant community graph generation process 400. As discussed in more detail below, the merchant community graph generation process 400 may be used to create a merchant community graph (e.g., graph 300) based on financial transactions executed by various merchants within the system 100. To create a merchant community graph, financial transaction data may be received from a database at step 402. For example, financial transaction data may be received from the database, for example, over a network connection. Financial transaction data may include one or more fields extracted from one or more digital and/or physical documents containing evidence of a transaction, for example, invoices, receipts, tax documents, estimates, money transfers, bank wires, emails, messages, and the like. The transaction data may be maintained in a table and may contain some or all of the following information:

<initiating merchant identifier, receiving merchant identifier, transaction document identifier, transaction date, transaction amount, initiating merchant location, receiving merchant location, general description>

It should be appreciated that some or all of the listed information may be required. Thus, to ensure that the process 400 has the proper information to form connections between merchants, specific data such as initiating merchant, receiving merchant, transaction document identifier, transaction date, and transaction amount may be used to properly catalog the input transactions. Step 402 may also include indexing each transaction and or grouping together transactions having similar characteristics (e.g., initiating merchant, transaction data, transaction amount, and the like).

At step 404, transaction data may be mapped to one or more identifiers for a merchant. Merchants may be associated with one or more merchant identifiers (e.g., company name, email address, physical address, telephone number, amount number, and the like). Transaction documents used to generate financial transaction data may have several different formats and any one of the merchant identifiers for a merchant may be included in financial transaction data for a particular transaction. Therefore, to ensure every transaction involving a particular merchant is associated with the merchant, all merchant identifiers extracted from financial transaction data must be mapped to their respective merchants. Merchant identifiers for a merchant may be included in merchant profile stored in a database and may be updated on a regular basis to ensure accuracy. Accordingly, some merchants may have hundreds or thousands of unique merchant identifiers. To enhance data quality and accuracy, the process 400 may require the transaction data to include two or more merchant identifiers for a particular merchant to associate the transaction with that merchant.

After mapping transactions to merchants, the mapped transaction data is then stored in a standard data format at step 406. To facilitate connection detection at step 408, the mapped data may be stored in a sparse matrix format. For example, merchant identifiers extracted from transaction data at step 404 may be represented in compressed sparse row (CSR), compressed row storage (CRS), or Yale format. Storing the merchant identifiers and other transaction data in a sparse matrix representation format improves the efficiency of transaction data processing by, for example, a first server 124, a second server 134, or other machine by allowing the machine to more efficiently allocate memory and balance processing load across available resources. Therefore, the machine is able to process transaction data stored in a sparse matrix representation faster and more efficiently. In particular, machines are able to interate through transaction data stored in a sparse matrix representation format to, for example, match merchant identifiers to transactions in less time and using fewer processing and memory resources compared to data processing methods incorporating other storage formats.

At step 408, merchant connections may be detected from the mapped transaction data. For example, merchant connections may be detected by matching merchant identifiers that appear in the same transaction observed in a spare matrix format representation of mapped transaction data. The position of the merchant identifiers within the spare matrix format representation of a particular transaction may indicate the merchants are participants in the transaction as well as the role (e.g., buyer, seller, and the like) of each merchant in the transaction. The merchant connections are then used to assemble a directed graph including the merchants as nodes and connections between merchants as edges.

The directed graph generated at step 408 may be generated from gigabytes or petabytes transaction data and therefore may include billions of merchants and connections. Most of the directed graph may contain loosely connected merchants and other noise. At step 410 merchant communities having active business relationships are identified within the directed graph based on the characteristics of merchant connections detected at step 408. To identify merchant communities, merchants may be clustered according to their connections with other merchants. For example, merchants may be clustered using bi-clustering algorithms to identify communities of merchants that are strongly connected (i.e., frequently interacting between themselves). Merchants may also be clustered using a connectivity algorithm, for example, strong_connected_components_search to identify merchant communities that are fully accessible (i.e., each node in the community can be accessed from every other node in the community).

Merchant communities identified at step 410 may be stored in a merchant community table including some or all of the following information:

<merchant identifier for each node, connections between the nodes, connection direction, connection strength>

In one or more embodiments, the connection strength may by one or more of weak, moderate, strong, very strong, to name a few. At step 412 a merchant community graph for one or more merchant communities may be created using the data included in the merchant community table for each merchant community included in the graph. At step 414, the merchant community graph may be enriched by adding additional information. For example, merchant attributes and connection attributes may be added to the graph to provide additional information about nodes and edges included in the graph. The additional information used to enrich the graph may be retained in the merchant community table and or other tables stored in a database. Merchant attributes may include:

<location, industry, number of customers, number of supplies, number of merchant connections, outbound invoice amount, gross receipt amount, inbound invoice amount, average inbound transaction amount, average outbound transaction amount, total transaction>

Connection attributes that may be used to enrich the merchant community graph may include:

<transaction direction, number of transactions, elapsed time since last transaction, transaction amount, average transaction amount>

In one embodiment, rather than maintaining a relational table, the merchants, connections and other merchant community data may be stored in suitable graph-type database. As such, the principles disclosed herein are not limited to the specific examples set out herein. The merchant community graph generated by the process 400 may contain nodes associated with various merchants of the system 100 and connections (e.g., weak, moderate, strong, very strong, etc.) between some or all of the nodes. In one embodiment, the merchant community graph may be output as part of a user interface displayed on one or more client devices of the system 100. In one embodiment, the merchant community table and or the merchant community graph may be analyzed for various purposes such as e.g., merchant profiling, industry monitoring, growing business operations, and the like (as explained below with reference to FIG. 6). Merchant attributes and merchant connection information may also be used to calculate a vector, label, feature, attribute, or other data representation of a merchant that may be input into a machine learning model. For example, merchant attributes and merchant connection information can be used as additional merchant features in machine learning models for fraud detection, advertisement targeting, customer recommendations, and the like.

Figure 5A:
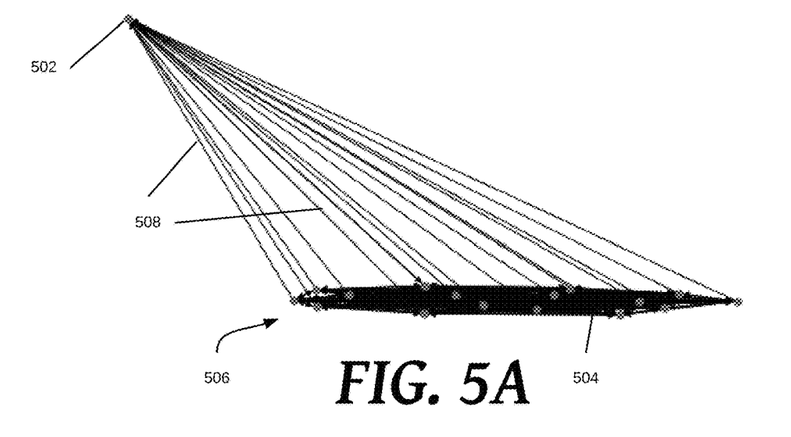
FIGS. 5A-5C illustrate exemplary merchant communities created from financial transaction data according to an embodiment of the present disclosure.
Figure 5B:
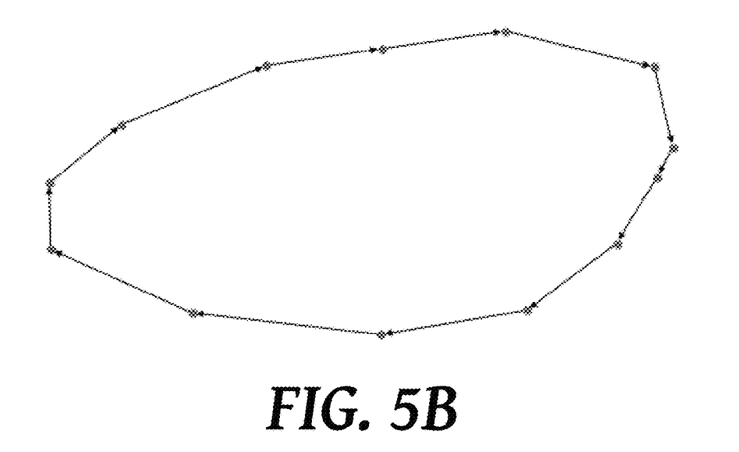
Figure 5C:
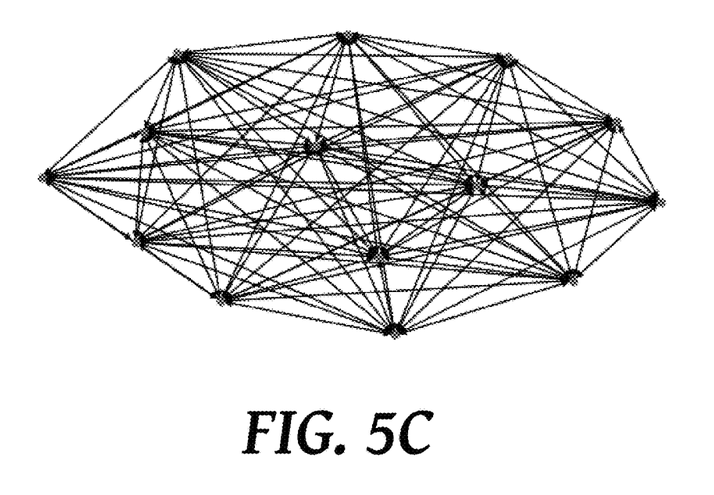

FIGS. 5A-5C illustrate exemplary merchant community graphs that may be generated according to the process 400 described in FIG. 4. FIG. 5A illustrates an exemplary merchant community identified using bi-clustering or another clustering technique that identifies communities of strongly connected nodes. The strong connection between the nodes is shown by the dark black area 504 between the nodes in the lower section 506 of the graph illustrating the density of the connections between each node. The multitude of connections 508 between the top node 502 and the nodes in the lower section 506 similarly indicates the top node 502 as being strongly connected to the nodes in the lower section 506. FIG. 5A also illustrates a merchant community with an observable supplier-customer relationship between the top node 502 (the supplier) and the nodes in the lower section 506 (the customers). The outbound direction of the connections from the top node 502 indicate that the top node 502 is responsible for initiating transactions (i.e., invoices) directed toward the nodes in the lower section 506 that are responsible for completing the transactions (i.e., paying the invoices).

FIG. 5B illustrates an exemplary merchant community that suggests fraud, money laundering, and or another illegal activity. The circular direction of the connections between each node indicates that financial transactions are occurring in a closed loop. Therefore, although money is exchanged in several financial transactions across many merchants, it appears to ultimately wind up with the same merchant. Fraud analysis may be performed on merchant communities to identify communities having characteristics of illegal activity. In response, the merchants involved in these communities may be flagged as suspicious and flagged merchants may be saved in a table and or graph that is stored in a database for rapid identification (e.g., for user in an investigation).

FIG. 5C illustrates an exemplary merchant community identified using a strongly connected components search or other clustering technique that identifies fully accessible communities. As shown in FIG. 5C, every node in the graph is connected to each other; therefore, it is possible to access every node in the graph from any of the nodes. Based on the density of the connections between the nodes, it is likely this community could also be identified using bi-clustering and or another clustering technique that identifies communities of strongly connected nodes.

Figure 6:
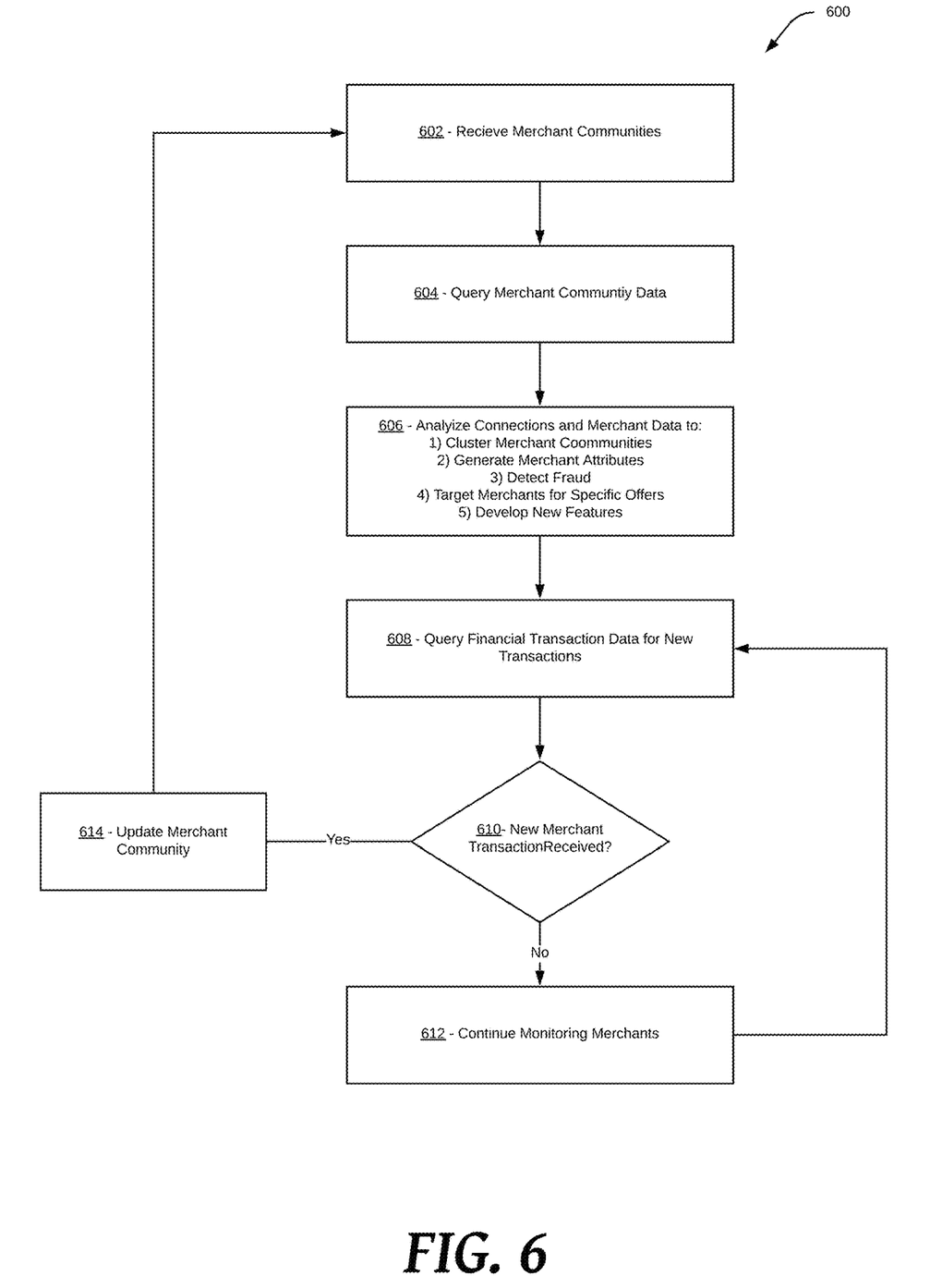
FIG. 6 shows a flow diagram illustrating an exemplary process for analyzing and using merchant communities according to an embodiment of the present disclosure.

FIG. 6 includes a flow chart illustrating an exemplary process 600 for analyzing merchant communities. The process 600 may begin by inputting a merchant community and or its merchant community table/graph at step 602. Once input, the merchant community and or its merchant community table/graph can be queried at step 604 by any known process. The merchant community and or merchant community table/graph may be configured to expose merchants, connections, and other merchant community data (e.g., merchant attributes and or connection attributes) for access by any query format (e.g., text search, graph based search, unique identifier search, filtering, sorting, ranking, and the like). Query results obtained at step 604 may be analyzed at step 606.

For example, merchant communities having certain characteristics (e.g., number of connections, number of merchants, industries, common connections, common merchants, number of transactions, connection strength, and the like) can be clustered to identify similar communities. The similar communities may then be ranked by the number of transactions to determine the community's usage of a particular information service. For example, usage may include the number of transactions the merchant processes on the information service and or a subscription level of the merchant's account on the information services. Some merchants may have a basic subscription level that is considered as a relatively low usage level. Other merchants may have a premium level subscription that is considered as a relatively high usage level. A premium level subscription may provide merchants access to one or more additional features of the information service. For example, the information service may have a payments feature that allows merchants to process payments and exchange money for a transaction between two or more merchants. The information service may also have a payroll feature that allows merchants to generate paychecks and transfer money to employees.

Communities with low usage can be targeted for offers and or promotions to increase their usage of the information service. For example, communities having a prevalence of basic accounts may be targeted for advertising of one or more premium features. Communities having a prevalence for one or more premium features may be targeted for advertising of one or more other premium features. Query results including particular communities that a merchant is a part of and or the community characteristics of each of the merchant's communities may be associated with the merchant as additional merchant attributes. For example, the number of merchant communities that include the merchant and or the ranking by size, number of transactions, connection strength, or other metrics of the merchant's communities relative to other communities may be saved as an attribute associated with the merchant. Merchant attributes may be saved in a table or other format stored in a database and used, for example, as input for a machine learning model. For example, a machine learning model that predicts a future number of transactions within an industry and or predicts new merchants likely to become part of a community.

Fraud detection may also be performed using query results. For example, the arrangement of the connections between merchants in a merchant community graph may be detected by querying merchant community graphs for a particular shape and or pattern of connections. The merchant's presence in a merchant community that is suspected of fraud may be saved as an additional merchant attribute.

Query results may also be used to identify merchants having specific characteristics that match the ideal candidate for a particular service and or promotion. Advertisements for the service and or promotion may then be sent to merchants matching profile and or criteria of the ideal candidate. New features (e.g., UIs, dashboards, document templates) may also be determined based on query results. For example, query results may be used to detect a large number of invoice transactions in communities including many merchants in the accounting services industry. Based on the query results, an invoice template and invoicing UI specific to accounting services may be developed and offered to the merchants in the accounting services industry through the information service.

The information service may continuously track financial transactions between merchants. At step 608 transaction data collected by the information service may be received, for example, over a network connection and queried to detect new transactions. If, at step 610, new transaction data including one or more new transactions are detected for one or more merchants of interest (i.e., a yes at step 610), the merchant communities including the merchants of interest may be updated at 614. The updated merchant communities may be received at step 602 and steps 604 and 606 may be repeated to analyze the updated merchant communities. If, at step 610, no new transactions are detected for one or more merchants of interest (i.e., a no at step 610), the merchants of interest may be monitored at step 612 by repeating steps 608 and 610. Steps 608-614 enable merchants and merchant communities to be tracked over time to construct dynamic merchant communities that may be used to better understand merchants and their changing business environments.

Figure 7:
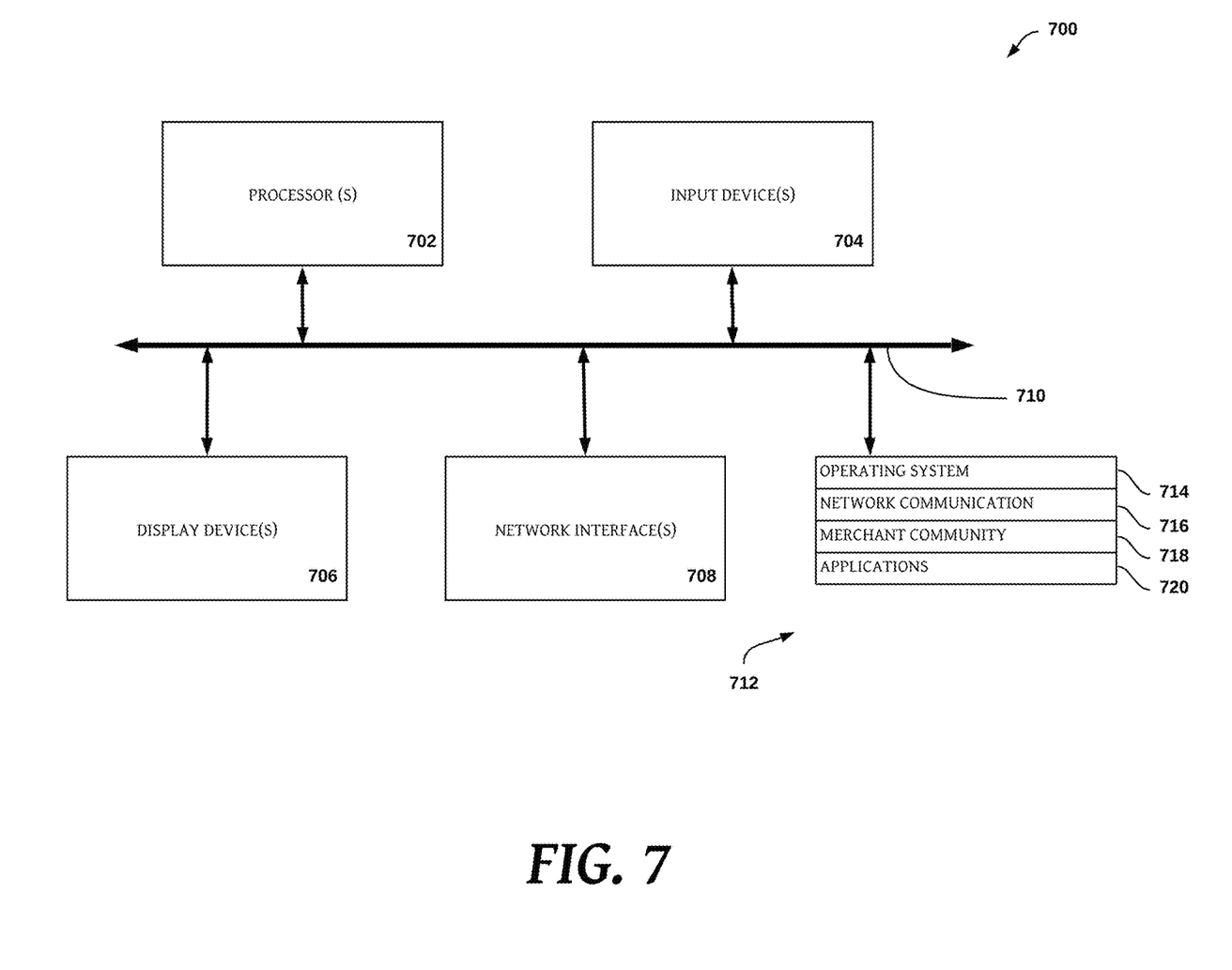
FIG. 7 is a block diagram illustrating a server device according to an embodiment of the present disclosure.

FIG. 7 is a block diagram of an example computing device 700 that may implement various features and processes as described herein. For example, computing device 700 may function as first server 120, second server 130, or a portion or combination thereof in some embodiments. The computing device 700 may be implemented on any electronic device that runs software applications derived from compiled instructions, including without limitation personal computers, servers, smart phones, media players, electronic tablets, game consoles, email devices, etc. In some implementations, the computing device 700 may include one or more processors 702, one or more input devices 704, one or more display devices 706, one or more network interfaces 708, and one or more computer-readable media 712. Each of these components may be coupled by a bus 710.

Display device 706 may be any known display technology, including but not limited to display devices using Liquid Crystal Display (LCD) or Light Emitting Diode (LED) technology. Processor(s) 702 may use any known processor technology, including but not limited to graphics processors and multi-core processors. Input device 704 may be any known input device technology, including but not limited to a keyboard (including a virtual keyboard), mouse, track ball, and touch-sensitive pad or display. Bus 710 may be any known internal or external bus technology, including but not limited to ISA, EISA, PCI, PCI Express, USB, Serial ATA or FireWire. Computer-readable medium 712 may be any non-transitory computer readable medium that participates in providing instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 712 may include various instructions 714 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 704; sending output to display device 706; keeping track of files and directories on computer-readable medium 712; controlling peripheral devices (e.g., disk drives, printers, etc.) which can be controlled directly or through an I/O controller; and managing traffic on bus 710. Network communications instructions 716 may establish and maintain network connections (e.g., software for implementing communication protocols, such as TCP/IP, HTTP, Ethernet, telephony, etc.).

Merchant community instructions 718 may include instructions that implement the disclosed process for constructing and using a merchant communities and merchant community graphs as described herein.

Application(s) 720 may be an application that uses or implements the processes described herein and/or other processes. The processes may also be implemented in the operating system 714.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As can be appreciated, the principles disclosed herein can narrow down thousands if not millions of transactions to a small subset of data representing a merchant community and or a merchant community graph. Accordingly, the disclosed principles may have small memory storage requirements, particularly when compared to the mass storage the information service provider requires to maintain each individual transaction. Moreover, because only a small subset of data representing the merchant community and or the merchant community graph is used by the disclosed principles, processing load is drastically reduced throughout the disclosed process. Another benefit of the disclosed principles is that they are useful as inputs to any other machine learning pipeline. For example, the merchant communities including patterns indicative of fraud or other illegal activity may be used to train machine learning models to detect fraud protection. Merchant community graphs may also be analyzed to detect fraud based on the arrangement of the merchants and connections in the community. These are major improvements in the technological art as it improves the functioning of the computer and is an improvement to the technology and technical fields of merchant community and merchant community graph creation and use (e.g., analysis of merchant communities for fraud detection, risk assessment, detection of similar merchants and communities, advertisement targeting, new feature development, dynamic attribute identification, and merchant profiling).

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method for constructing and using a merchant community graph, the method implemented by a server comprising one or more processors and one or more memory devices storing computer-executable instructions that are executed by the processors for:
   receiving over a network connection financial transaction data including multiple transactions associated with two or more merchants;
   for each transaction included in the financial transaction data:
   determining the two or more merchants in a particular transaction; and
   determining a connection between the two or more merchants in the particular transaction;
   clustering the two or more merchants into one or more merchant communities, the clustering comprising at least one of identifying, based on a bi-clustering algorithm, merchants having multiple shared transactions and identifying, based on a connectivity algorithm, a fully accessible merchant community;
   ranking the clustered one or more merchant communities by a number of transactions to determine a community's usage of an information service;
   targeting offers or promotions to communities with a usage below a particular usage level;
   for each merchant community, storing merchant community data that identifies the two or more merchants and the connection between each merchant of the two or more merchants included in the merchant community in a sparse matrix that allocates space across the memory devices of the server and balances a processing load across available processors of the server;
   generating a merchant community graph using the merchant community data stored in the sparse matrix, the merchant community graph including an arrangement of connections between the multiple merchants included in the one or more merchant communities;
   querying the merchant community graph for a particular merchant community having an arrangement of connections that matches a particular shape associated with fraud;
   flagging the multiple merchants included in the particular merchant community as suspicious; and
   displaying a graph that includes the flagged multiple merchants in a user interface.

2. The method of claim 1, wherein determining the two or more merchants in a particular transaction comprises:
   mapping one or more merchant identifiers to each merchant of the two or more merchants;

determining the two or more merchant identifiers included in the transaction data for the particular transaction; and matching the one or more merchant identifiers for each merchant included in the transaction data for the particular transaction to associate the two or more merchants with the particular transaction.

3. The method of claim 1, further comprising: receiving over the network connection new financial transaction data associated with the two or more merchants in a particular merchant community; and updating the merchant community data for the particular merchant community based on the new financial transaction data.

4. The method of claim 1, wherein the merchant community data further comprises merchant attributes and connection attributes.

5. The method of claim 4, further comprising:

enriching the merchant community graph with at least one of the merchant attributes and the connection attributes.

6. The method of claim 4, wherein determining the connection between the two or more merchants in the particular transaction further comprises:

determining a direction for the connection based on a role of the two or more merchants in the particular transaction; and determining a connection strength for the connection based on at least one of a number of transactions, a transaction date, or a transaction amount for the particular transaction.

7. The method of claim 4, further comprising:

querying the merchant community graph; and using the merchant community data included in the merchant community graph to identity merchants to target for advertising.

8. The method of claim 4, further comprising:

querying the merchant community graph; and using the merchant community data included in the merchant community graph to determine similar merchant communities and rank each merchant community included in the similar communities according to one or more characteristics of each merchant community.

9. The method of claim 4, further comprising: querying the merchant community graph; and using the merchant community data included in the merchant community graph to generate a dynamic attribute for at least one of the merchants of the two or more merchants.

10. A server system for constructing and using a merchant community graph, the server system comprising one or more processors and one or more memory devices storing computer-executable instructions that are executed by the processors to:

receive over a network connection financial transaction data including multiple transactions associated with two or more merchants;

for each transaction included in the financial transaction data:

determine the two or more merchants in a particular transaction; and determine a connection between the two or more merchants in the particular transaction;

cluster the two or more merchants into one or more merchant communities by at least one of identifying, based on a bi-clustering algorithm, merchants having multiple shared transactions and identifying, based on a connectivity algorithm, a fully accessible merchant community;

rank the clustered one or more merchant communities by a number of transactions to determine a community's usage of an information service and target offers and/or promotions to communities with a usage below a particular usage level;

for each merchant community, store merchant community data that identifies the two or more merchants, the connection between each merchant of the two or more merchants included in the merchant community in a sparse matrix that allocates space across the memory devices of the server and balances a processing load across available processors of the server;

generate a merchant community graph using the merchant community data stored in the sparse matrix, the merchant community graph including an arrangement of connections between the multiple merchants included in the one or more merchant communities;

query the merchant community graph for a particular merchant community having an arrangement of connections that matches a particular shape associated with fraud;

flag the multiple merchants included in the particular merchant community as suspicious; and display a graph that includes the flagged multiple merchants in a user interface.

11. The system of claim 10, wherein the one or more processor are further configured to determine the one or more merchants in a particular transaction by:

mapping one or more merchant identifiers to each merchant of the two or more merchants;

determining the one or more merchant identifiers included in the transaction data; and matching the one or more merchant identifiers for each merchant included in the transaction data to associate the two or more merchants with the particular transaction.

12. The system of claim 10, wherein the one or more processors are further configured to: receive over the network connection new financial transaction data associated with the two or more merchants in a particular merchant community; and update the merchant community data for the particular merchant community based on the new financial transaction data.

13. The system of claim 10, wherein the merchant community data further comprises merchant attributes and connection attributes.

14. The system of claim 13, wherein the one or more processors are further configured to:

enrich the merchant community graph with at least one of the merchant attributes and the connection attributes.

15. The system of claim 13, wherein the one or more processors are further configured to determine the connection between the two or more merchants in the particular transaction by:

determining a direction for the connection based on a role of the two or more merchants in the particular transaction; and determining a connection strength for the connection based on at least one of a number of transactions, a transaction date, or a transaction amount for the particular transaction.

16. The system of claim 13, wherein the one or more processors are further configured to:

query the merchant community graph; and use the merchant community data included in the merchant community graph to identity merchants to target for advertising.

17. The system of claim 13, wherein the one or more processors are further configured to:
query the merchant community graph; and
use the merchant community data included in the merchant community graph to determine similar merchant communities and rank each merchant community included in the similar communities according to one or more characteristics of each merchant community.

18. The system of claim 13, wherein the one or more processors are further configured to: query the merchant community graph; and
use the merchant community data included in the merchant community graph to generate a dynamic attribute for at least one of the merchants of the two or more merchants.

* * * * *